(12) United States Patent
Gervais et al.

(10) Patent No.: US 11,202,443 B2
(45) Date of Patent: Dec. 21, 2021

(54) AQUACULTURE ENVIRONMENT CONTROL APPARATUSES, SYSTEMS, AND METHODS

(71) Applicant: The trū Shrimp Company, Balaton, MN (US)

(72) Inventors: Robert H. Gervais, Currie, MN (US); Kasey E. Holm, Balaton, MN (US); Dennis J. Johnson, Windom, MN (US); Michael B. Ziebell, Spicer, MN (US)

(73) Assignee: THE TRU SHRIMP COMPANY, Balaton, MN (US)

( * ) Notice: Subject to any disclaimer, the term of this patent is extended or adjusted under 35 U.S.C. 154(b) by 0 days.

(21) Appl. No.: 17/001,471

(22) Filed: Aug. 24, 2020

(65) Prior Publication Data
US 2020/0383303 A1   Dec. 10, 2020

Related U.S. Application Data

(63) Continuation of application No. 16/295,395, filed on Mar. 7, 2019, now Pat. No. 10,757,924, which is a
(Continued)

(51) Int. Cl.
*A01K 63/04* (2006.01)
*B01F 3/04* (2006.01)
(Continued)

(52) U.S. Cl.
CPC ............ *A01K 63/042* (2013.01); *A01K 61/00* (2013.01); *A01K 63/04* (2013.01); *B01F 3/0412* (2013.01);
(Continued)

(58) Field of Classification Search
CPC .... B01F 3/04; B01F 3/04099; B01F 3/04241; B01F 3/04262; B01F 2003/04148;
(Continued)

(56) References Cited

U.S. PATENT DOCUMENTS 2,479,403 A   8/1949   Powers
3,904,393 A   9/1975   Morse
(Continued)

FOREIGN PATENT DOCUMENTS

GB   1541345 A   2/1979
JP   5615831 A   2/1981
(Continued)

OTHER PUBLICATIONS

Extended European Search Report for Application No. 17748120.7, dated Aug. 8, 2019.
(Continued)

*Primary Examiner* — Robert A Hopkins
(74) *Attorney, Agent, or Firm* — Billion & Armitage (57) ABSTRACT

Embodiments of the present disclosure describe an aquaculture environment control system comprising one or more control apparatuses positioned within a vessel at an angle relative to a proximal vessel wall and configured for scouring of the vessel, wherein each control apparatus has a discharge conduit and each discharge conduit has one or more orifices; and a fluid source in fluid communication with each of the control apparatuses. Embodiments of the present disclosure describe a method of controlling an aquaculture environment comprising supplying one or more of a fluid and gas to a control apparatus positioned within a vessel at an angle relative to a proximal vessel wall; and discharging one or more of the fluid and gas from the control apparatus at a fluid velocity sufficient for scouring of the vessel.

17 Claims, 6 Drawing Sheets

Related U.S. Application Data continuation of application No. 15/220,141, filed on Jul. 26, 2016, now Pat. No. 10,251,375.

(60) Provisional application No. 62/290,718, filed on Feb. 3, 2016.

(51) Int. Cl.
*B01F 5/04* (2006.01)
*A01K 61/00* (2017.01)

(52) U.S. Cl.
CPC ........ *B01F 3/0451* (2013.01); *B01F 3/04113* (2013.01); *B01F 3/04241* (2013.01); *B01F 3/04262* (2013.01); *B01F 5/0403* (2013.01); *B01F 2003/04148* (2013.01); *B01F 2215/0052* (2013.01); *Y02P 60/60* (2015.11)

(58) Field of Classification Search
CPC ..... B01F 3/0412; A01K 63/042; A01K 61/00; A61K 63/04
See application file for complete search history.

(56) References Cited

U.S. PATENT DOCUMENTS

| | | | |
|---|---|---|---|
| 4,304,740 | A | 12/1981 | Cernoch |
| 5,961,831 | A | 10/1999 | Lee |
| 6,932,025 | B2 | 8/2005 | Massingill et al. |
| 8,128,070 | B1 | 3/2012 | Allan et al. |
| 8,336,498 | B2 | 12/2012 | Lawrence |
| 8,833,743 | B2 * | 9/2014 | Ko .................. C02F 3/201 261/121.1 |
| 8,974,670 | B1 | 3/2015 | Emr |
| 8,985,055 | B2 | 3/2015 | Lawrence |
| 2005/0120970 | A1 | 6/2005 | Massingill et al. |

FOREIGN PATENT DOCUMENTS

| | | |
|---|---|---|
| JP | 56015831 | 2/1981 |
| JP | 560115831 A | 2/1981 |

OTHER PUBLICATIONS

Office Action from related CN Application No. 201710063474.4, dated Sep. 20, 2019.
Advanced Industrial Aeration, "Aeration, Mixing, and De-Gassing all with one energy source", 2007, <http://www.aiaaeration.com/aquaculture.htm>, 5 pages.
Braga, et al., "Use of a Non-Venturi Air Injection System for Production of Litopenaeus vannamei in Biofloc-Dominated Zero-Exchange Raceways", Aquaculture 2013, Nashville, Tennessee, USA, Feb. 21-25, 2013, 27 pages.
Burrows, et al., "Evaluation of Three Types of Fish Rearing Ponds", Research Report 39, Fish and Wildlife Service, United States Department of the Interior. Figure 5A, p. 8 first column, Apr. 16, 2012, 8.
FAO, "The State of World Fisheries and Aquaculture", FAO Fisheries and Aquaculture Department, Food and Agriculture Organization of the United Nations, Rome, 2012.
Samocha, "An Update on Dr. Tzachi Samocha's Research", Shrimp News International, Nov. 2012, <http://www.shrimpnews.com/FreeReportsFolder/PondEcologyFolder/SamochaTzachiResearch2012.html>.
Samocha, et al., "Ongoing Studies Advance Intensive Shrimp Culture in Zero-Exchange Biofloc Raceways", global aquaculture advocate, Mar./Apr. 2013, pp. 38-40.
Timmons, et al., "Culture Tank Design", 2006.

* cited by examiner

AQUACULTURE ENVIRONMENT CONTROL APPARATUSES, SYSTEMS, AND METHODS

CROSS REFERENCE TO RELATED APPLICATION

This application is a continuation of U.S. application Ser. No. 16/295,395, filed on Mar. 7, 2019, which is a continuation of U.S. application Ser. No. 15/220,141, filed on Jul. 26, 2016, now U.S. Pat. No. 10,251,375, which claims priority to U.S. Provisional Application No. 62/290,718, filed Feb. 3, 2016, which applications are incorporated by reference in their entirety.

BACKGROUND

As the global population continues to climb and health trends encourage consumption of fish and crustaceans such as shrimp, ocean marine life populations worldwide are becoming depleted. According to the United States Food and Agriculture Organization (FAO), per capita fish consumption has increased from an average of 9.9 kg in the 1960s to 16.4 kg in 2005. The FAO has since reported that in 2009 about 88% of monitored fish stocks were overexploited, depleted, recovering from depletion, or fully exploited, which has resulted in devastating impacts to aquatic ecosystems worldwide. For example, in January of 2016, almost 300 species of fishes, clams, crustaceans were classified as either threatened or endangered. Further, harvesting wild marine life requires a large amount of fuel, about 620 liters per tonne of fish, which excludes the significant energy consumption for subsequent transport, cooling, and processing.

In recent years, aquaculture has been identified as a solution to the global marine sustainability crisis and a source of food for an ever expanding global population. This burgeoning industry includes the production and husbandry of aquatic plants and animals (e.g., fish, mollusks, and crustaceans) in controlled environments, such as tanks. Issues surrounding aquaculture have involved maintaining clean, efficient environments, maintaining a threshold level of dissolved oxygen within the water, and, in some circumstances, creating water current within the environment to satisfy the biological needs of inhabitant organisms.

Issues surrounding aquaculture have also involved scalability. While shallow-water raceways can be designed, developed, and implemented as laboratory-scale pilots, efforts to scale the pilots to, for example, commercially feasible dimensions have failed. The laboratory-scale pilots have used common airlift pumps and/or air-diffuser tubing to create and/or maintain required dissolved oxygen levels and/or create sufficient current to activate the raceway. However, when the same common airlift pumps and air-diffuser tubing have been used in scaled designs, the design has either completely failed, or the required dissolved oxygen levels and current cannot be maintained. The amount of horsepower required to drive high volume, low pressure air pumps for these types of scalable designs is not only inefficient, but also cost-prohibitive. Moreover, no stock size piping exists that is sufficiently large enough to convey the amount of air required for these designs. The common airlift pumps and common air-diffuser tubing were found to be inadequate for purposes relating to scalability.

Figure 1:
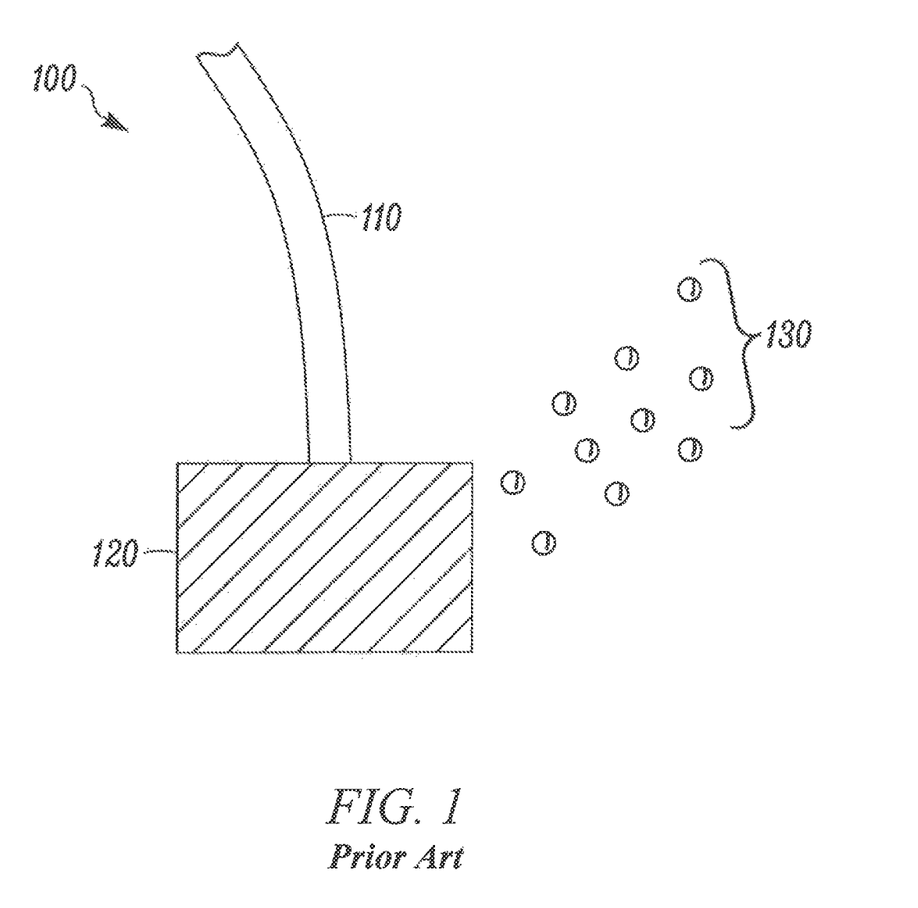
FIG. 1 illustrates an air diffuser, according to the prior art.

FIG. 1 illustrates a commonly known air diffuser 100 utilized for oxygenating aquatic environments, which typically comprise an air source 110 in fluid communication with a diffuser stone, disk, tube, or disc 120. Air is directed through the diffuser 120 whereupon it is converted to a plurality of bubbles 130 which are more easily dissolved into the aquatic environment and cause less disruptive environmental turbulence than a single stream of air. Air diffusers suffer from the disadvantage that the diffuser is highly susceptible to fouling, and requires a large volume of air to sufficiently oxygenate an aquatic environment. Further, they produce little or no current.

Experimental aeration nozzles have been explored in academic settings as an alternative method for oxygenating aquatic environments, but in order to generate sufficient oxygenation, their use can generate a highly disruptive level of turbulence from discharge. Additionally, experimental aeration nozzles only provide current in a limited area and are not suitable for industrial scale vessels.

SUMMARY

In general, embodiments of the present disclosure relate to aquaculture environment control systems, methods of controlling aquaculture environments, and the like.

Embodiments of the present disclosure describe an aquaculture environment control system comprising one or more control apparatuses positioned within a vessel at an angle relative to a proximal vessel wall and configured for scouring of the vessel, wherein each control apparatus has a discharge conduit and each discharge conduit has one or more orifices; and a fluid source in fluid communication with each of the control apparatuses.

Embodiments of the present disclosure describe a method of controlling an aquaculture environment comprising supplying one or more of a fluid and gas to a control apparatus positioned within a vessel at an angle relative to a proximal vessel wall; and discharging one or more of the fluid and gas from the control apparatus at a fluid velocity sufficient for scouring of the vessel.

The details of one or more examples are set forth in the accompanying drawings and the description below. Other features, objects, and advantages will be apparent from the description and drawings, and from the claims.

BRIEF DESCRIPTION OF THE DRAWINGS

The accompanying drawings illustrate non-limiting example embodiments of the invention.

DETAILED DESCRIPTION

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Disclosed herein are systems and methods for controlling an aquaculture environment which provide industrial scalability and enhanced environmental consistency. The systems and methods disclosed herein are not limited by environment geometry or size, and further allow for heightened environmental control of current speed, inclusion distribution, fluid temperature, and waste removal, among others.

In general, this disclosure describes embodiments of an aquaculture environment control system for controlling aquaculture environments. In particular, this disclosure describes embodiments that expediently introduce fluid to generate currents and introduce inclusions at uniform rates in an aquaculture environment in such a manner that inhabitants of environment are not disturbed.

The systems and methods described herein are suitable for controlling an aquatic environment in which many varieties of aquatic life can live and grow, including fish, crustaceans, and mollusks. The systems and methods described herein can be utilized to raise aquatic life for commercial purposes, such as in high volume. For example, the vessel can be controlled to grow up to 3.0 kg of aquatic life per cubic meter. The systems and methods described herein can utilize shallow vessels (e.g., as shallow as 0.03 meters) or deep vessels (e.g., 5 meters or deeper). An example of aquatic life is Litopenaeus vannamei. Alternatively, the systems and methods described herein can be utilized to house or grow highly desired aquatic species, such as endangered species or highly valued species. Additionally or alternatively, the systems and methods described herein are suitable for controlling an aquatic environment in which aquatic plants can live and grow.

An aquaculture environment control system described herein can include a plurality of discharge conduits positioned in a vessel, the discharge conduits including one or more orifices. The aquaculture environment control system described herein can include one or more of a fluid source in fluid communication with the plurality of discharge conduits and a gas supply source in fluid communication with at least one of the plurality of discharge conduits. The aquaculture environment control system described herein can discharge fluid from the plurality of discharge conduits into the vessel to create and/or maintain a current throughout fluid present within the vessel.

Figure 2A:
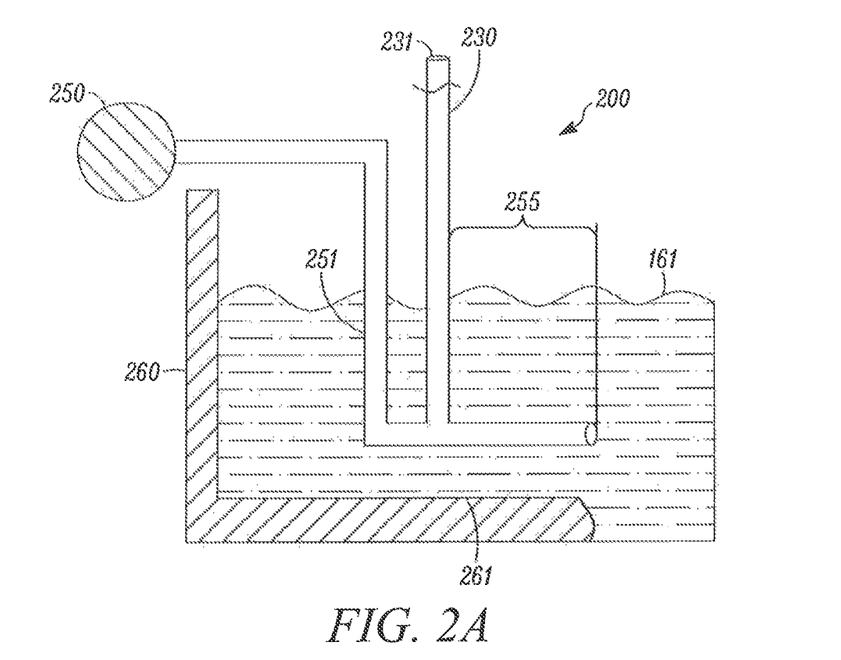
FIG. 2A illustrates a side view of an aquaculture environment control apparatus, according to one or more embodiments.

FIG. 2A illustrates a side view of an aquaculture environment control apparatus 200 positioned within, or at least partially within, a vessel 260. Apparatus 200 comprises a fluid supply pipe 251 in fluid connection with a discharge conduit 255. Fluid supply pipe 251 can comprise one pipe, several pipes, or a plurality of articles capable of delivering fluid, such as water, to a discharge conduit 255. Discharge conduit 255 can be positioned under a water level 161. In some embodiments discharge conduit 255 can be positioned above the water level 161. Discharge conduit 255 comprises one or more orifices 256 which will be described in detail below. Fluid supplied from a fluid source, such as header 250, is directed to discharge conduit 255 via fluid supply pipe 251, and fluid is discharged through the one or more orifices of the discharge conduit 255. An air supply source, such as air supply pipe 230 fluidly connects to the fluid supply pipe 251 upstream from discharge conduit 255. In some embodiments the air supply pipe 230 can optionally connect to the fluid supply pipe 251 proximate to the discharge conduit 255. Air or gas is directed through the air supply pipe 230 and contacts the liquid in the liquid supply pipe 251 before being discharged through the discharge conduit 255. Air or gas can be supplied via a pump or pressurized source, for example. In some embodiments, the air supply pipe 230 operates as a venturi and air or gas is drawn into the liquid stream by virtue of the movement of fluid within the fluid supply pipe 251 and/or the geometry of the piping near the connection point between the air supply pipe 230 and the fluid supply pipe 251. In such embodiments, air supply pipe 230 comprises an open end 231 distal to the connection end with the fluid supply pipe, such open end 231 being preferably oriented above the water level 161. Air or gas in all embodiments can comprise ambient air, pure oxygen, oxygen enriched air, or other gases which suit the needs of the aquatic system. In embodiments comprising an open end 231 distal to the connection end with the fluid supply pipe, the open end 231 is open to atmosphere and the air or gas comprises atmospheric air. In other such embodiments, the air or gas comprises whatever gaseous composition is ambiently present proximate the open end 231 (e.g., oxygen enriched atmospheric air).

Figure 2B:
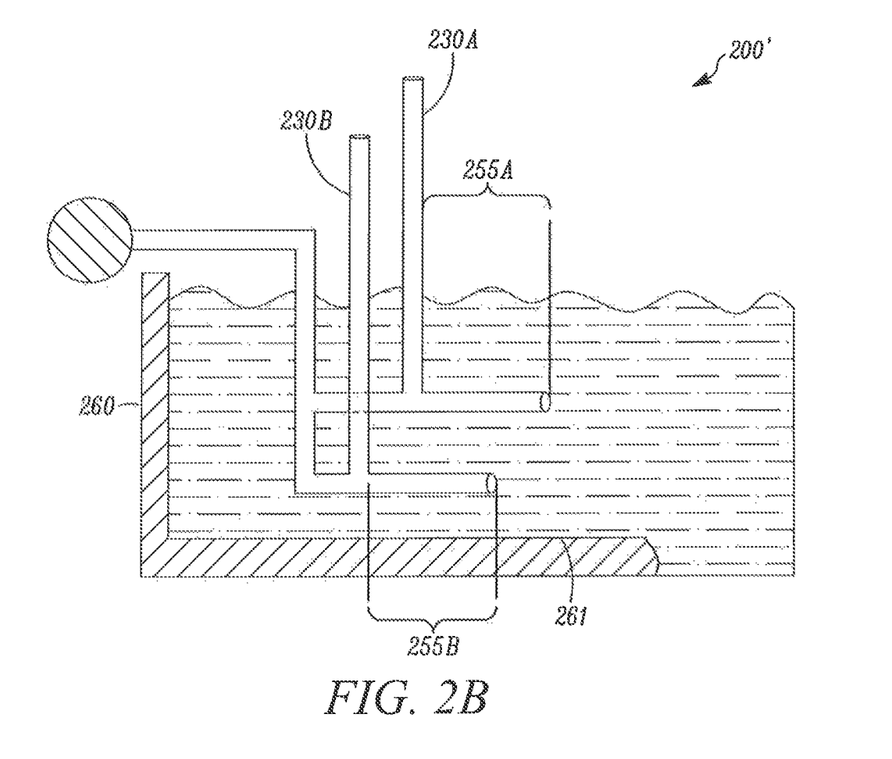
FIG. 2B illustrates a side view of an aquaculture environment control apparatus 200' positioned within a vessel 260, according to one or more embodiments.

FIG. 2B illustrates a side view of an aquaculture environment control apparatus 200' positioned within a vessel 260, wherein the apparatus 200' comprises a plurality of discharge conduits 255. FIG. 2B shows air supply pipes 230A and 230B dedicated to each of the discharge conduits 255A and 255B, respectively; however in some embodiments a single air supply pipe 230 can service a plurality of discharge conduits 255. Apparatus 200' accordingly discharges fluid into vessel 260 at a plurality of heights relative to the vessel bottom 261 via the plurality of discharge conduits 255. In each apparatus 200 and 200', the discharge conduits 255, 255A, and 255B are shown oriented parallel to vessel bottom 261. In some embodiments a discharge conduit 255 can be angled or perpendicular relative to a vessel bottom 261, as will be described in more detail below. In such embodiments, fluid can be discharged into vessel 260 at a plurality of heights relative to the vessel bottom 261 via a single discharge conduit 255. Moreover, apparatuses 200 and 200' discharge fluid into vessel 260 at a plurality of distances relative to a proximate vessel side via one or more of discharge conduits 255, a plurality of orifices 256 (which will be described in detail below), or combinations thereof.

Figure 2C:
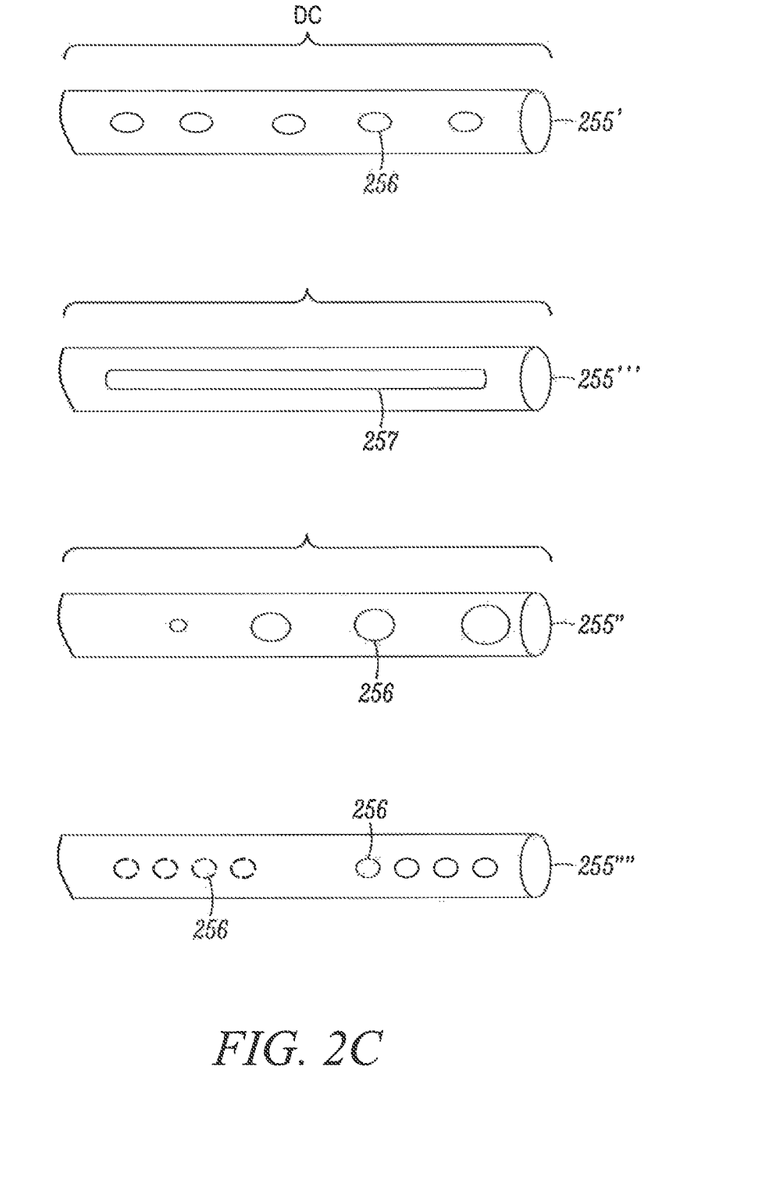
FIG. 2C illustrates various embodiments of discharge conduit, according to one or more embodiments.

FIG. 2C illustrates various alternative embodiments of discharge conduits 255. Discharge conduit 255' comprises a plurality of uniform discharge orifices 256. A discharge conduit 255 can comprise any number of orifices 256 based on the length of the discharge conduit 255 and the desired orifice 256 size, for example. Orifices 256 are typically circular to for the sake of manufacturing convenience, although other orifice shapes are suitable. The size of the orifice 256 can be determined based upon the pressure of the fluid supply and the desired discharge velocity of the fluid, for example. Discharge conduit 255" comprises a plurality of variously sized orifices 256. In this particular embodiment, orifice size increases as a function of distance from the fluid supply pipe 251 (not shown) to account for fluid pressure drop across the discharge conduit 255" and accordingly provide a substantially similar discharge velocity from each orifice. Similarly, orifice 256 sizes can be chosen to effect a varying discharge velocity from individual orifices.

Figure 3A:
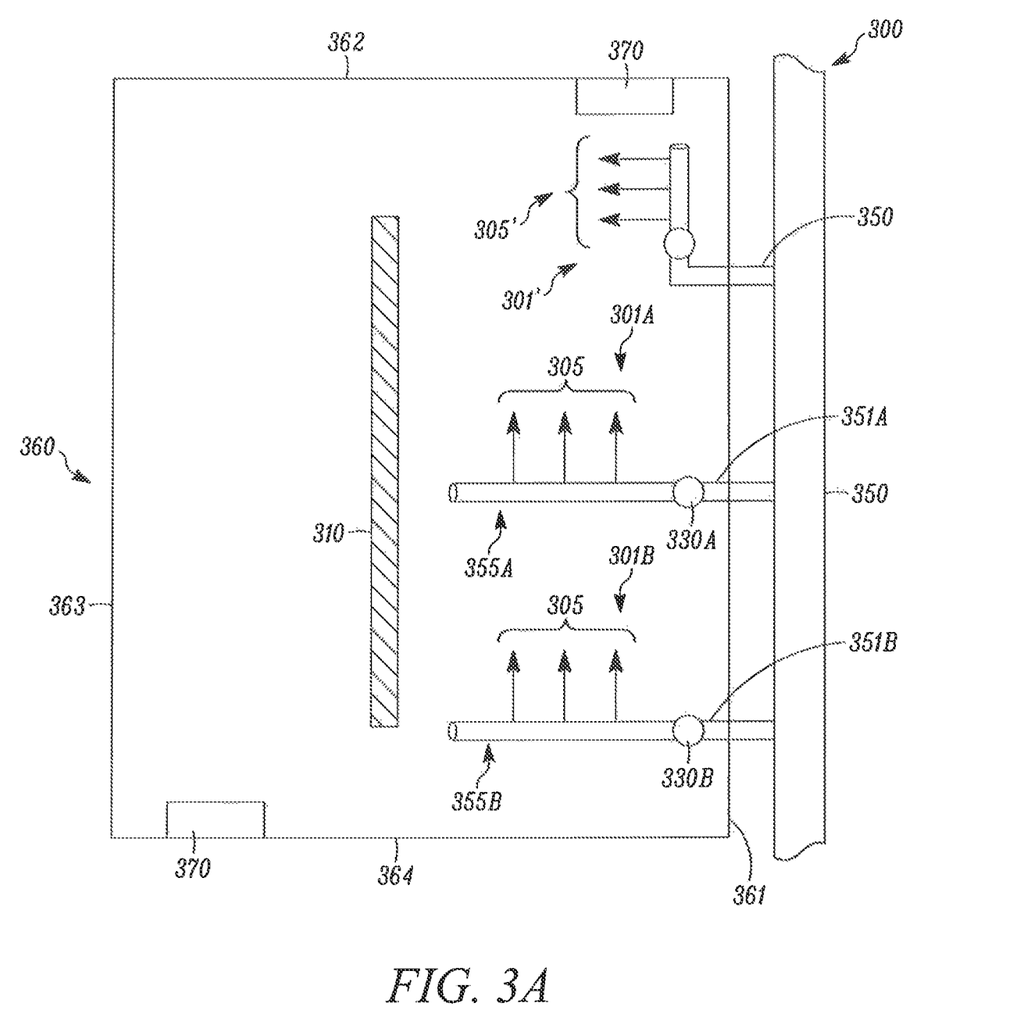
FIG. 3A illustrates a top view of an aquaculture environment control system, according to one or more embodiments.

FIG. 3A illustrates an aquaculture environment control system 300 comprising one or more control apparatuses 301 (shown 301A and 301B) positioned within a vessel 360 and having a discharge conduit 355 (shown 355A and 355B) in fluid communication with a fluid source 350 via fluid supply pipes 351 (shown 351A and 351B). In some embodiments, all control apparatuses are in fluid communication with a single fluid source 350, such as a header. In such embodiments, the inner diameter of the header can reduce as distance from the fluid supply end of the header increases to account for head loss and provide a more even fluid pressure at each control apparatus 301. In other embodiments, system 300 can comprise a plurality of fluid sources 350. Each control apparatuses 301A and 301B is associated with air supply pipes 330A and 330B, however in alternate embodiments a plurality of control apparatuses 301 can be associated with a single air supply pipe 330. System 300 can optionally further comprise one or more fluid intakes 370 which can continuously or periodically separate fluid from the vessel 360 for one or more of processing, supplementation, recycling, or the like. In some embodiments, fluid intake 370 comprises a pump or like suction device capable of creating a pressure differential relative to the fluid in vessel 360 and draw fluid out of the vessel 360. In other embodiments, fluid intake 370 separates fluid from vessel 360 gravimetrically by virtue of its position (i.e., proximate the vessel 360 bottom). In some embodiments, fluid intake 370 utilized both induced pressure differential and gravimetric approaches to separate fluid from vessel 360. System 300 can comprise fluid communication between one or more fluid intakes 370 and one or more fluid sources to facilitate recycling of fluid. Embodiments herein typically require at least one fluid intake 370, and additional fluid intakes 370 can be optionally incorporated. In some embodiments, fluid intake 370 comprise a screen or solids collection system to separate aquatic waste from entering the fluid intake 370.

The one or more control apparatuses 301 can be positioned within vessel 360 at a position generally perpendicular to the proximal vessel wall 361, although a precise perpendicular orientation between the discharge conduit and the vessel wall is not required. In such an orientation, fluid discharged from the one or more control apparatuses 301 in direction 305 creates and/or maintains a generally circular current in vessel 360. Direction 305 is not necessarily an absolute direction; rather, direction 305 describes a direction which is substantially consistent with a desired current. Therefore where a circular current in vessel 360 is desired, a control apparatus 301 associated with vessel wall 363 can discharge fluid in a direction 305 which is substantially opposite (e.g., 180 degrees) from the direction 305 of fluid discharged from a control apparatus 301 associated with vessel wall 361. Fluid discharged from the one or more control apparatuses 301 can additionally or alternatively deliver inclusions to the vessel 360, as will be discussed below. The velocity of fluid discharged from one or more control apparatuses 301 can be varied to achieve a desired current velocity within vessel 360. Additionally, a minimum fluid velocity can be set in order to achieve a desired level of scouring within the control apparatus piping and components to prevent fouling. For example, a fluid velocity within a control apparatus 301 pipe can be between 2 and 5 feet per second.

In order to achieve suitable current at all fluid depths within a vessel 360 and/or uniformly introduce inclusions into a fluid body within the vessel 360, control apparatuses 301 can be positioned at a plurality of heights relative to the vessel 360 bottom such that fluid is discharged at a plurality of heights relative to the vessel 360 bottom. Accordingly, control system 300 is scalable to vessels of all depths. Additionally or alternatively, one or more discharge conduits 355 of the one or more control apparatuses 301 can be angled or perpendicular relative to a vessel bottom 361, such that fluid is discharged at a plurality of heights relative to the vessel 360 bottom.

Circular current within a vessel 360 is further facilitated by the one or more fluid intakes 370 by virtue of their orientation within the vessel 360 wherein the fluid intake direction of the fluid intake 370 is substantially similar to the direction of fluid current within the vessel. System 300 can additionally or alternatively include a control apparatus 301' positioned at the downstream end of the proximal vessel wall 361 at a position generally parallel to the proximal vessel wall 361. Fluid is discharged from control apparatus 301' in a direction 305' which is consistent with a desired circular current maintained or created by one or more control apparatuses 301. In combination with one or more control apparatuses 301, control apparatus 301' further assists in reducing fluid resistance by redirecting fluid flow at a vessel geometry variation (i.e., a corner).

In some optional embodiments, all or a portion of the fluid discharged from the one or more discharge conduits 355 is discharged at a slight angle relative to the proximal vessel wall 361 such that the fluid converges upon the proximal vessel wall 361. For example, the fluid can be discharged from the one or more discharge conduits 355 at an angle about 1 degree, about 2.5 degrees, about 5 degrees, about 7.5 degrees, or about 10 degrees relative to the proximal vessel wall 361. The proximal vessel wall can include an outer wall, a partition, or a partitioning geometry as will be described below. A slightly angled fluid discharge capably creates and/or maintains a generally circular current while also encouraging aquatic waste aggregation at the periphery of the vessel. Such aggregation beneficially purifies the aquatic environment within the vessel 360 and further simplifies the removal of aquatic waste. Aquatic waste can include excrement, urine, molt, unconsumed feed, and other undesired species within a vessel. Molt refers to discarded bodily growths, and can include molted exoskeletons, such as those from crustaceans, scales, claws, nails, and the like.

Angled fluid discharge can be achieved in a number of embodiments, individually or in combination. In a first embodiment, the fluid source 350 is angled relative to the proximal vessel wall 361. In a second embodiment, the one or more control apparatuses 301 are angled relative to the proximal vessel wall 361. In a third embodiment, fluid discharged from the one or more discharge conduits 355 is angled relative to the discharge conduit. Angled fluid discharge relative to a discharge conduit 355 can be achieved by altering the bore angle of an orifice (not shown in FIG. 3), and/or incorporating a discharge directing element such as a fin on the surface of the discharge conduit 355. In some embodiments, where a discharge conduit 355 comprises a plurality of orifices, only a portion of the orifices can be configured to provide angled fluid discharge.

FIG. 3A illustrates a system 300 wherein one vessel wall 361 is physically associated by one or more control apparatuses 301 and/or 301', however in other embodiments, one or more control apparatuses 301 and/or 301' can be associated with two or more vessel walls (e.g., vessel walls 361, 362, 363, 364, and combinations thereof). The number of vessel walls associated with one or more control apparatuses 301 and/or 301' can be determined based on vessel periphery geometry. For example, for a long and narrow rectangular vessel periphery geometry, it may be sufficient or desirable for the one or more control apparatuses 301 and/or 301' to associate the two long vessel walls. As shown, one or more control apparatuses 301 and/or 301' can originate from an outer wall of the vessel 360. In other embodiments, one or more control apparatuses 301 and/or 301' can originate from an inner partition 310 of the vessel 360. In some embodiments, one or more control apparatuses 301 and/or 301' can originate and/or be associated with a plurality of outer vessel walls (e.g., outer walls 361 and 363). Accordingly, in such embodiments, the length of the one or more control apparatuses 301 and/or 301' can extend up to the length of the vessel 360. In some embodiments, the length of the one or more control apparatuses 301 is up to half of the length of the vessel 360, or up to the distance between proximate wall 361 and partition 310, in order to generate a circular current within the vessel 360. In some embodiments, the one or more control apparatuses 301 can span the entire length of the vessel 360. In some such embodiments, orifices of the discharge conduit 355 can be positioned to discharge fluid in two different directions, as shown in discharge conduit 255'''' with orifices 256 in FIG. 2C. In such embodiments, two separate groupings of oppositely positioned orifices can span a vessel center line, partition, or partitioning geometry in order to facilitate circular current within the vessel 360.

The number and placement of control apparatuses 301 and/or 301' can be determined based on the need for current generation, and the ability to efficiently and/or uniformly deliver inclusions to the vessel 360. For example, deep tanks may require control apparatuses 301 and/or 301' at a plurality of vertical positions to ensure uniform and/or suitable current flow and/or inclusion delivery at substantially all vessel 360 depths. Accordingly, embodiments described herein provide industrial scalability for all conceivable tank geometries.

Similarly, FIG. 3 illustrates a system 300 wherein two vessel walls 362 and 364 are comprise one or more fluid intakes 370, however other in other embodiments, three or more vessel walls (e.g., vessel walls 361, 362, 363, 364, and combinations thereof) can comprise one or more fluid intakes 370. The number of vessel walls comprising one or more fluid intakes 370 can be determined based on vessel periphery geometry. For example, for a square vessel periphery geometry it may be desirable for the fluid intakes 370 to be positioned on three or more walls to assist in current creation, and/or as necessitated by waste removal needs. Additionally, it can be desirable to include many fluid intakes 370 in system 300 such that vessel aquatic conditions (e.g., salinity) can be quickly adjusted to suit the needs of vessel 360 aquatic inhabitants, as will be described below.

As relating to all embodiments herein, the periphery geometry of a vessel can comprise square, rectangular, circular, and other polygon geometries such as an irregular hexagonal geometries. Vessel 360 periphery geometries can be selected in consideration of manufacturing method or materials of construction, for example. Vessel periphery geometries can additionally or alternatively be selected to facilitate or reduce disruption to current within the vessel. For example, a circular geometry, an ovular geometry, or an irregular hexagonal geometry formed by beveling the corners of a rectangular geometry can each minimize or eliminate undesired turbulence or eddies. For example, turbulence in the corner of a vessel may cause undesired spread of accumulated waste. Further, beveled or rounded vessel corners can reduce current resistance and require less power consumption by the system pumps in order to achieve a desired current velocity. While the above embodiments have been described as utilizing a rectangular vessel periphery geometry, it is understood that all such embodiments are practicable with the various periphery geometries now described. Additionally or alternatively, while the above embodiments have been described as utilizing vessel walls oriented perpendicularly to vessel bottoms, other orientations of walls are suitable. In some embodiments, a vessel 360 can comprise a natural or man-made body of water, such as a pond.

The vessel can optionally include a partition to encourage desired current flow. In one embodiment, a vessel includes a planar partition 310, as shown in FIG. 3, positioned proximate the center of the vessel 360 in a generally vertical orientation to create a circular current path. Planar partition 310 can extend throughout the entire vertical extent of a fluid within the vessel 360, or alternatively a portion thereof. A planar partition can be suitably substituted with a three-dimensional partition, such as a cylindrical structure. While the above described embodiments have included a circular current pattern, other flow patterns are similarly practicable. For example, a series of partitions can be utilized to form a serpentine current path. Such an orientation can be desirable where a single, large vessel is economically or spatially preferable to a plurality of smaller vessel and smaller environmental spaces are desirable for inhabitant aquatic life, for example. Partitions can further be used to secure discharge conduits in a preferred orientation (e.g., distance from vessel bottom and/or orientation angle to proximal vessel wall).

The vessel 360 bottom can optionally comprise partitioning geometry. Vessel bottom partitioning geometry can be utilized in addition to or as an alternative to partitions. Examples of partition geometry include a nadir or apex incorporated into the vessel bottom. In the case of either a nadir or an apex, the vessel bottom can be divided into a plurality of faces which slope down or up, respectively, from an associated vessel side wall. For example, for a vessel having a rectangular periphery geometry, a vessel bottom can comprise two faces which intersect in a nadir or apex. Similarly, for a vessel having a rectangular periphery geometry, a vessel bottom can comprise four faces which intersect in a nadir or apex. In such an embodiment, the vessel bottom can comprise four triangular vessel bottom faces, or, alternatively, two triangular vessel bottom faces and two rectangular bottom faces.

A vessel bottom comprising a nadir or apex can be used in combination with or in the alternative to angled fluid discharge to assist in aggregating waste within the vessel, as described above. It will be understood that a nadir vessel bottom orientation will likely aggregate waste at the nadir (e.g., near the center of the vessel), and an apex vessel bottom orientation will aggregate waste near the periphery of the vessel. A vessel bottom comprising an apex and greater than two bottom faces (e.g., a vessel having a rectangular periphery geometry and a bottom comprising four faces) can further provide enhanced encouragement of circular current by reducing fluid resistance. Vessel bottom apexes and nadirs can also be utilized in circular tanks, for example, wherein the vessel bottom will comprise a generally convex and concave, respectively, conical shape.

Figure 3B:
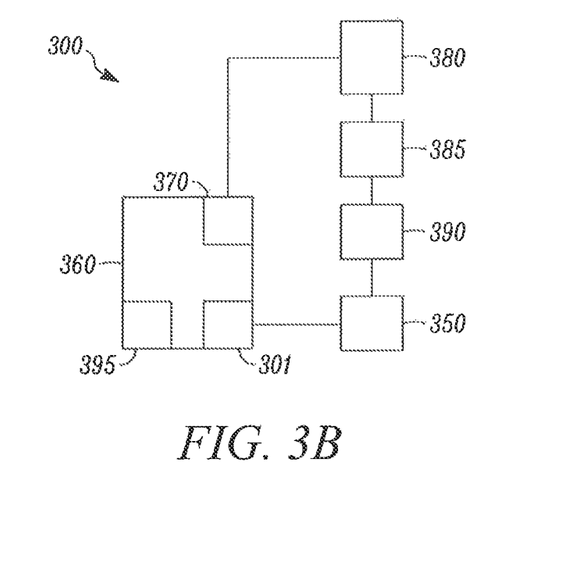
FIG. 3B illustrates a schematic of an aquaculture environment control system, according to one or more embodiments.

As illustrated in FIG. 3B, system 300 optionally comprises one or more of a fluid treatment system 380, a temperature modulator 385, one or more inclusion introducers 390, and one or more sensors 395. In some embodiments, system 300 is a closed-loop system, wherein fluid is continually introduced into and removed from vessel 360. In other embodiments, system 300 is a partially closed-loop system, wherein a portion of the fluid removed from vessel 360 via the one or more fluid intakes 370 is separated from the fluid cycle and the remaining portion is recycled.

System 300 and related methods can utilize fluid discharge from one or more control apparatuses 301 and/or 301' to deliver inclusions to an aquatic environment within a vessel (e.g., vessel 360). Inclusions can include one or more of temperature controlled fluid, salt, biofloc, aquatic feed, air or gases, antimicrobial compositions, pH regulators, and carbon sources. Biofloc includes a protein rich aggregate of organic material and micro-organisms including bacteria, protozoa, algae, and the like. Antimicrobial compositions can include antibiotics, antivirals, and antifungals, for example. Specific antiviral compositions include those described in PCT Application No.: US2015/041592. Examples of pH regulators include sodium bicarbonate, among many others, and can be used to control the alkalinity and acidity of an aquatic environment. Carbon sources include simple sugars, molasses, and glycerin, among many others. A plurality of inclusions can be introduced from the same fluid source 350. Alternatively, a plurality of fluid sources can be used to introduce inclusions. Utilizing a plurality of control apparatuses 301 and/or 301' to deliver inclusions to an aquatic environment within a vessel (e.g., vessel 360) advantageously allows for uniform and expeditious distribution throughout the vessel 360, and reduces shock to aquatic life within vessel 360 by eliminating highly concentrated pockets of inclusions at a single or few introduction points. Accordingly, conditions within vessel 360 can be highly controlled while minimizing detrimental aspects of known inclusion delivery (e.g., single-point feed introduction). Similarly, the temperature of an aquatic environment within a vessel 360 can be controlled via the temperature modulator 385. Temperature modulator 385 can comprise a heat exchanger, a cooler, a heater, or combinations thereof. As with introduction of inclusions, modifying the temperature of an aquatic environment via a plurality of control apparatuses 301 and/or 301' reduces temperature shock to aquatic life within vessel 360, particularly as compared to systems that modify temperature using a single fluid introduction site.

In some embodiments, conditions within the vessel 360 can be automated. One or more sensors 395 can comprise salinity sensors, temperature sensors, particulate sensors, and the like. A salinity sensor can be used to detect an undesired salinity level within vessel 360 and communicate with an inclusion introducer 390 such that a level of salt added to fluid source 350 via inclusion introducer 390 can be modified. Further, water treatment system 380 can be utilized to filter fluid removed from vessel 360.

In some embodiments, system 300 can comprise a plurality of vessels 360. The plurality of vessels 360 can be stacked vertically such they at least partially overlap. Vessels 360 can be stacked to efficiently utilize space in a facility, to facilitate transfer of aquatic life from one vessel to another, or to facilitate the removal of waste and/or harvested aquatic life.

As relating to all embodiments herein, the aquaculture environment control systems described herein provide unprecedented scalability. The aquaculture environment control systems described herein can be designed for low volume purposes, such as for non-commercial purposes, or designed for high volume purposes, such as for large-scale commercial purposes. The aquaculture environment control systems described herein can achieve water management objectives, including, but not limited to, dissolved oxygen and desired currents. The aquaculture environment control system has the ability, power, and flexibility to facilitate turning the current at vessel widths of greater than 12 feet. In addition, additional vessel length is only dependent on one or more of pumping capacity, pipe dimension, and venturi count necessary to achieve one or more water management objectives. The width and length of the vessel of the aquaculture environment control system can be designed based on, for example, one or more of water management objectives, spatial constraints, and target production amounts at harvest.

As relating to all embodiments herein, the dimensions of the vessel of the aquaculture environment control system are too numerous to be recited herein. A person of ordinary skill in the art would readily understand the dimensions, including the broad range thereof, capable of achieving the one or more water management objectives. In some embodiments, the vessel can be about 3 feet in width by about 12 feet in length. In some embodiments, the vessel can be about 9.5 feet in width by about 14 feet in length. In some embodiments, the vessel can be about 9.5 feet in width by about 37 feet in length. In some embodiments, vessels can be about 12 feet in width by about 600 feet in length with 8 vessels stacked vertically and each vessel having a capacity of holding about 55,000 gallons. As relating to all embodiments herein, the height of the vessel can be freely chosen and the water depth is limited only by the height of the vessel. In some embodiments, the water depth can be greater at a side of the vessel and smaller at an apex of the vessel.

As relating to all embodiments herein, the aquaculture environment control system can assist and/or facilitate the harvest process. In some embodiments, the aquaculture environment control system can assist and/or facilitate driving aquatic life to one or more harvest ports.

As relating to all embodiments herein, an aquaculture environment control system can further comprise a cleaning solution source in fluid communication with one or more of the plurality of discharge conduits. In some embodiments, the cleaning solution source is in fluid communication with the one or more plurality of discharge conduits via one or more of the associated fluid supply pipe or one or more valves, such as an in-line inclusion valve. The aquaculture environment control system can circulate and/or recirculate a cleaning solution to clean the aquaculture environment control system, including each of the pipes and vessels. In this way, the aquaculture environment control system can be self-cleaning. The aquaculture environment control system can be cleaned to satisfy and/or be in compliance with water quality and food safety standards.

In some embodiments, one or more of the following steps can be used to clean the aquaculture environment control system: expelling one or more of remaining salt water, aquatic life, and waste from the vessel and supplying a cleaning solution from a cleaning solution source to an aquaculture environment control system. Expelling can include removing everything from the aquaculture environment control system that is not desired for cleaning. Supplying can include one or more of opening a valve and pumping the cleaning solution from the cleaning solution source. In some embodiments, the drain valves can be closed before, during, or after supplying the cleaning solution to the aquaculture environment control system. In some embodiments, the drain valves can be closed before opening the valve from which the cleaning solution is supplied. In some embodiments, the cleaning solution is pumped through the aquaculture environment control system either after or contemporaneously with the closing of the drain valves and opening of the valve from which the cleaning solution is supplied. In some embodiments, the cleaning solution travels throughout the aquaculture environment control system one or more times to thoroughly clean and rinse the aquaculture environment control system before restocking. In some embodiments, the cleaning solution can include one or more of ozonated fluids and disinfectants.

Figure 4:
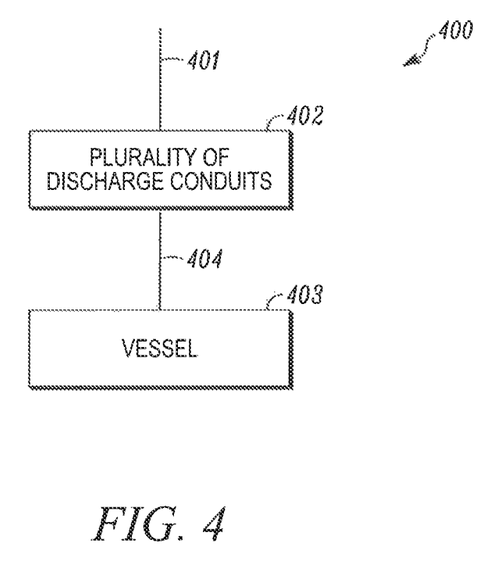
FIG. 4 illustrates a block flow diagram of a method of controlling an aquaculture environment, according to one or more embodiments of this disclosure.

FIG. 4 illustrates a block flow diagram of a method of controlling an aquaculture environment, according to one or more embodiments of this disclosure. A method 400 of controlling an aquaculture environment can include supplying 401 one or more of a fluid and a gas to a plurality of discharge conduits 402 positioned in a vessel 403; and discharging 404 the one or more of the fluid and the gas from at least one of the plurality of discharge conduits 402 to the vessel 403, the discharging creating or maintaining a current within the vessel.

What is claimed is:

1. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and at least one of the one or more discharge conduits is angled relative to the vessel bottom.

2. The aquaculture environment control system of claim 1, wherein at least one of the one or more discharge conduits is configured to discharge the fluid at a plurality of heights relative to the vessel bottom.

3. The aquaculture environment control system of claim 1, wherein a plurality of discharge conduits is configured to discharge the fluid at a plurality of heights relative to the vessel bottom.

4. The aquaculture environment control system of claim 1, wherein at least one of the one or more discharge conduits is parallel to the vessel bottom.

5. The aquaculture environment control system of claim 1, wherein discharging the fluid at a plurality of heights maintains a directional current at one or more fluid depths.

6. The aquaculture environment control system of claim 1, wherein discharging the fluid at a plurality of heights uniformly introduces one or more inclusions into the vessel.

7. The aquaculture environment control system of claim 1, wherein the one or more inclusions are selected from a temperature controlled fluid, a salt, a biofloc, an aquatic feed, air, one or more gases, antimicrobial compositions, pH regulators, carbon sources, and combinations thereof.

8. The aquaculture environment control system of claim 1, further comprising a gas supply source in fluid communication with at least one of the one or more discharge conduits.

9. The aquaculture environment control system of claim 1, further comprising one or more fluid intakes.

10. The aquaculture environment control system of claim 1, further comprising a gas supply source in fluid communication with at least one of the one or more discharge conduits.

11. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and wherein at least one of the one or more discharge conduits is perpendicular relative to the vessel bottom.

12. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and wherein the one or more discharge conduits discharge the fluid at an angle relative to a proximal vessel wall.

13. The aquaculture environment control system of claim 12, wherein the one or more discharge conduits include one or more orifices configured to provide angled fluid discharge.

14. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and wherein the one or more discharge conduits include a plurality of discharge conduits disposed within the vessel and wherein the plurality of discharge conduits extend along at least a portion of the length of a vessel wall.

15. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and further comprising a partition located proximate to a vessel center and extending along a length of the vessel.

16. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and wherein the vessel bottom includes an apex or a nadir.

17. An aquaculture environment control system comprising:
one or more discharge conduits in fluid communication with a fluid source and positioned within a vessel which houses one or more aquatic organisms, wherein one or more of said discharge conduits are configured to discharge a fluid from the fluid source at a plurality of heights relative to a vessel bottom and wherein the vessel includes one or more rounded vessel corners.

* * * * *